Feb. 6, 1968　　　P. W. SCHLOSSER　　　3,367,270
FLUID POWER TRANSFER APPARATUS

Original Filed Dec. 11, 1964　　　　　　　　5 Sheets-Sheet 1

INVENTOR.
PAUL W. SCHLOSSER

INVENTOR.
PAUL W. SCHLOSSER

United States Patent Office 3,367,270
Patented Feb. 6, 1968

3,367,270
FLUID POWER TRANSFER APPARATUS
Paul W. Schlosser, Chicago, Ill., assignor to Panther Pumps & Equipment Company, Inc., Chicago, Ill., a corporation of Illinois
Original application Dec. 11, 1964, Ser. No. 417,537, now Patent No. 3,254,845, dated June 7, 1966, which in turn is a continuation-in-part of Ser. No. 336,432, Jan. 8, 1964. Divided and this application June 6, 1966, Ser. No. 582,173
24 Claims. (Cl. 103—44)

ABSTRACT OF THE DISCLOSURE

The present invention relates to fluid power transfer apparatus such as a pump, having a diaphragm which carries a valve for closing a port, the valve being disposed between the diaphragm and the port.

This application is a division of application Ser. No. 417,537, filed Dec. 11, 1964, now Patent No. 3,254,845, which in turn is a continuation-in-part of application Ser. No. 336,432, now abandoned, filed Jan. 8, 1964.

The present invention relates to pressure operated fluid power transfer apparatus and is more particularly directed to new and improved pump apparatus and to new and improved methods of maintaining favorable operating temperature of such apparatus.

Heretofore, difficulty has been encountered in the design and construction of pressure operated fluid power transfer apparatus, particularly pump apparatus which utilize forces generated by a power operated prime mover acting on a first material such as pumping or driving liquid in turn acting on a separator member to cause movement of a second material, i.e., pumped material such as a fluid, located on the opposite side of the separator member.

Design parameters for such prior art pump apparatus include auxiliary equipment to recirculate the pumping liquid under the influence of the prime mover of the pumping liquid and to cool the pumping liquid.

The auxiliary equipment of such prior art apparatus to recirculate the pumping liquid under the influence of the prime mover is provided primarily to maintain the pumping liquid and the desired level of pressure forces thereof in the apparatus during those periods in which the second material is not being passed through the apparatus. For otherwise, it would be necessary to re-establish pumping liquid operating pressure forces each time the second material was to be passed through the pump. It will be appreciated that the time delay that would be caused by the necessity for re-establishing pumping liquid operating pressure, each time the second material was to be passed through the pump, would be particularly disadvantageous for some uses of the apparatus, for example, when used as intermittently operated paint spraying apparatus.

Recirculation of the pumping liquid in pump apparatus for such purpose imposes an attendant disadvantage in that the power requirements on the apparatus power source are greater during such pumping liquid recirculation periods than the power requirements during those periods when the second material is being passed through the pump. The power requirements are greater during recirculation because during this period the pressure of the pumping liquid in the pumping chamber is at its maximum and the power required to move the prime mover of the pumping liquid against this pressure is consequently at its maximum.

Another attendant disadvantage of such prior art apparatus is that during such recirculation periods, the temperatures of the pumping liquid and of pump apparatus parts exhibit a high deleterious rise when compared to the temperatures of the pumping liquid and pump apparatus during periods when the second material is being passed through the pump. Accordingly, prior art apparatus required such auxiliary cooling equipment, such as large cooling tanks or heat exchange equipment through which the pumping liquid is by-passed during its recirculation cycle, for cooling the pumping liquid and pump parts to thereby maintain a proper operating temperature level of the pump apparatus. A large cooling tank is bulky and heavy, and heat exchange equipment imposes additional power requirements on the apparatus disadvantageously during the time period, i.e., during the period in which the second material is not being pumped, when the pump apparatus is drawing maximum power to maintain desired pumping liquid pressures.

The requirements of the prior art pump apparatus for such large size, bulky, and expensive auxiliary equipment has resulted in apparatus which is non-portable and, therefore, is generally permanently installed, so that it is thus usable in a fixed location. The non-portability disadvantage of such prior art apparatus for use in paint spraying is therefore apparent, because then the item or items to be painted must generally be portable. However, some prior apparatus for paint spraying use is truck mounted when portability is desired. Even with such truck portability, however, it is not feasible to use the apparatus on 115 volt circuitry, because the amperage load required by such apparatus usually exceeds safe limits for ordinary wiring, and higher voltages are not commonly available in a large percentage of the area of the world.

With the present invention, the aforementioned problems and difficulties, among others, of the prior art are substantially overcome by the provision of portable, pressure operated, power transfer apparatus, such as pumps, which eliminates the requirement of prior art apparatus for auxiliary recirculation and cooling equipments.

The apparatus of the present invention utilizes a cavitation phenomenon to maintain the temperature of the pumping liquid and thus associated pump apparatus parts substantially the same, during periods when the pump is not moving the second material, as the temperature of the pumping liquid and associated pump parts during periods when the pump is moving the second material through the pump, and also to minimize the power requirements of the apparatus during periods of cavitation in which the second material is not being passed through the apparatus.

In accordance with the present invention, the action of the prime mover on the pumping liquid is utilized, during periods when the second material is not being passed through the pump, to produce a cavitation effect on the pumping liquid in the pumping liquid chamber. The pump parts associated with the puming liquid have an overall temerature under conditions when the pump is moving the second material through the pump and these parts have an overaell temperature under "standby" conditions when the pump is not moving the second material through the pump. The cavitation phenomenon is utilized in accordance with the present invention to maintain the overall temperature of these pump parts under "standby" conditions substantially the same as the temperature of these parts under operating conditions. Utilization of the cavitation phenomenon for this purpose is hereinafter referred to as "cavitation cooling."

During cavitation operation the pumping liquid is cyclically evaporated instantaneously (cavitates) and the vapor thus produced subsequently condensed. Such evaporation and condensing caused by cavitation results in cavitation cooling of the pumping liquid and pump parts, particularly those parts in contact with the pumping liquid and vapor. Moreover, utilization of the cavitation phenomenon results in a reduction in the power requirements of the pump during cavitation of the pumping liquid when the second material is not being passed through the pump, as compared to the power requirements of the apparatus when the second material is being passed through the pump.

These power requirement characteristics of apparatus constructed in accordance with the present invention contradistinguish the present invention from the aforementioned prior art apparatus wherein the power requirements of the apparatus are at a maximum when the second material is not being passed through the pump.

Accordingly, it is therefore an object of the present invention to provide new and improved pressure operated fluid power transfer apparatus.

Another object of the present invention is to provide an improved liquid-driven-apparatus for fluids.

A further object of the present invention is to provide a new and improved spraying system for liquids, such as paints and the like.

Still another object of the present invention is to provide new and improved pump apparatus.

A still further object of the present invention is to provide new and improved portable pump apparatus.

Another object of the present invention is to provide a new and improved high pressure pump apparatus having a diaphragm and a driven fluid valve operatively associated with the diaphragm and arranged so as to minimize the possibility of damage being caused to the diaphragm during high pressure operation thereof.

A still further object is to provide a new and improved pump apparatus including a diaphragm having balanced fluid pressures across the diaphragm except when the diaphragm is in at least one limiting position.

Still another object of the present invention is to provide new and improved supply apparatus for the pumping liquid of a high pressure pump apparatus including a diaphragm in which there is substantially no leakage path of high pressure pumping liquid, except to a source of said liquid.

A still further object of the present invention is to provide a high pressure pump including a diaphragm and a supply apparatus for the pumping liquid including means for automatically cleaning the supply of pumping liquid.

Still another object of the present invention is to provide a new and improved readily adjustable linkage for varying the volumetric capacity of a diaphragm pump so that the pump is capable of pumping fluids at different pressures and/or capacities with substantially constant power consumption.

A still further object of the present invention is to provide new and improved pressure operated fluid power transfer apparatus utilizing the phenomenon of cavitation of the pumping fluid to maintain the temperature of the pumping liquid and associated pump parts at a desired temperature level.

Still further objects and advantages of the invention reside in methods of operation and/or control of apparatus of the preceding objects.

The preceding and other objects and advantages of this invention will be either obvious or pointed out in the following specification and claims, when read in view of the accompanying drawings, in which:

FIG. 2 is a longitudinal sectional view of the pump end of said one modification on an enlarged scale;

Cavitation phenomena are useful in each of the modifications of my present invention. Only a small quantity of pumping or driving liquid is used, as compared to prior usage in diaphragm pumps wherein heating of the pumping liquid presented liquid cooling problems. Because the pumping liquids used in this new apparatus are caused to vaporize and condense, the pumping liquid and pump parts remain at low temperatures even though the pumping liquid is highly compressed when driving fluids at elevated pressures.

The pumping appartus constructed in accordance with the principles of this invention is characterized by having a plurality of horsepower limiting devices which function cooperatively.

The first horsepower limiting device includes a prime mover, having a drive piston and utilizing the phenomenon of cavitation of the driving liquid between liquid and vapor phases thereof to reduce the horsepower required to operate the drive piston of the apparatus when there is very little or no driven or pumped fluid demand, i.e., second material is not passed through the pump while the drive piston, or the like, remains in operation.

The second horsepower limiting device is in the form of a pre-calibrated, one-way relief valve and is particularly useful in connection with intermittently operated paint spray guns, or the like, but not restricted to such use.

In one aspect, the pump apparatus of the present invention is further characterized by having a thin walled heat conducting diaphragm carrying valves cooperable with pumping liquid and pumped fluid valve seats. When flow rate of the pumped fluid through the pump is reduced or terminated, the pumping liquid valve carried by the diaphragm is automatically closed by the diaphragm reaching a predetermined limit of travel with the pumping liquid valve and diaphragm in engagement with pump housing parts including the valve seats. When the pumping valve reaches this limiting position, the hydraulic liquid pressure of the pumping liquid in the apparatus will tend to rise above the pressure of the pumped fluid.

The second horsepower limiting device in the form of the pre-calibrated, one-way relief valve is adapted to operate when pumping liquid pressure attains this higher pressure to vent pumping liquid from the pumping liquid chamber in an amount exceeding the predetermined desired volume of liquid required while the apparatus is pumping the pumped fluid to provide in the pumping chamber a lower volume for attaining the first horsepower limiting function, as more fully described hereinbelow.

The first horsepower limiting functions also to replenish pumping liquid that may leak around parts of the pump and includes one or more low pressure valves, such as reed-type or ball valves, that can be opened by atmospheric pressure, for example. When the pumping liquid valve is closed in the above mentioned limiting position at the end of a pumped fluid intake movement of the diaphragm, the pressure in the pumping chamber causes "vacuum pressure" opening of pumping liquid check valve means. The check valve or valves, when open, are in low pressure liquid communication with the driving liquid in the pumping chamber and a source of supply of the liquid to supply a minute amount of make-up driving liquid to the pumping chamber. However, the apparatus may be designed to cause these vacuum pressure valves to be open during the intake movement of the diaphragm.

With the pump arranged for maximum pumped fluid displacement, the driving piston, or the like, is moved through a maximum range of movement to reciprocate the diaphragm and driven fluid valve carried by the diaphragm between the limiting positions of travel thereof in each reciprocation, or cycle of the piston. Driving liquid leakage is replenished at the end of the intake movement of each cycle. Parts are preferably proportioned so that a very small excess of make-up liquid is replenished. Thus, on the driving part of the cycle the horsepower-limiting relief valve may vent a minute amount of liquid if the pumped fluid valve, mentioned above, closes at the end of a driving part of a cycle; however, under such circumstances, several succeeding cycles will obtain at the desired maximum capacity and efficiency of the pump.

It is presently preferred that pumps be constructed for use at maximum inherent capacity. It is not essential, however, that such capacity be used and thus a lesser capacity but higher pressure driven fluid output can be attained. To accomplish changeover from a first pump volumetric capacity, for example, at 5,000 p.s.i. to a second capacity substantially half of the first capacity, but at 10,000 p.s.i., or to a third capacity half of the second capacity, but at 2,000 p.s.i., changes of only two parts are required to attain these, and other, capacities, while using the same horsepower for driving the liquid in one modification of the invention. One part to be changed is the horsepower-limiting relief valve; and the other part is the piston driving linkage.

In the lesser capacity, higher pressure adaptations of the pump apparatus, the diaphragm will have a shorter amplitude as it cycles. Such cycling will not attain both limits in a single cycle as mentioned above for the maximum amplitude of cycle. It is important, however, that driving liquid supply and vent functions be provided to attain the aforementioned horsepower limiting operation, and to prevent damage to pump parts when starting and running because the movement of the diaphragm can attain one or the other of the valve seating limits intermittently.

Figures 1, 1B:
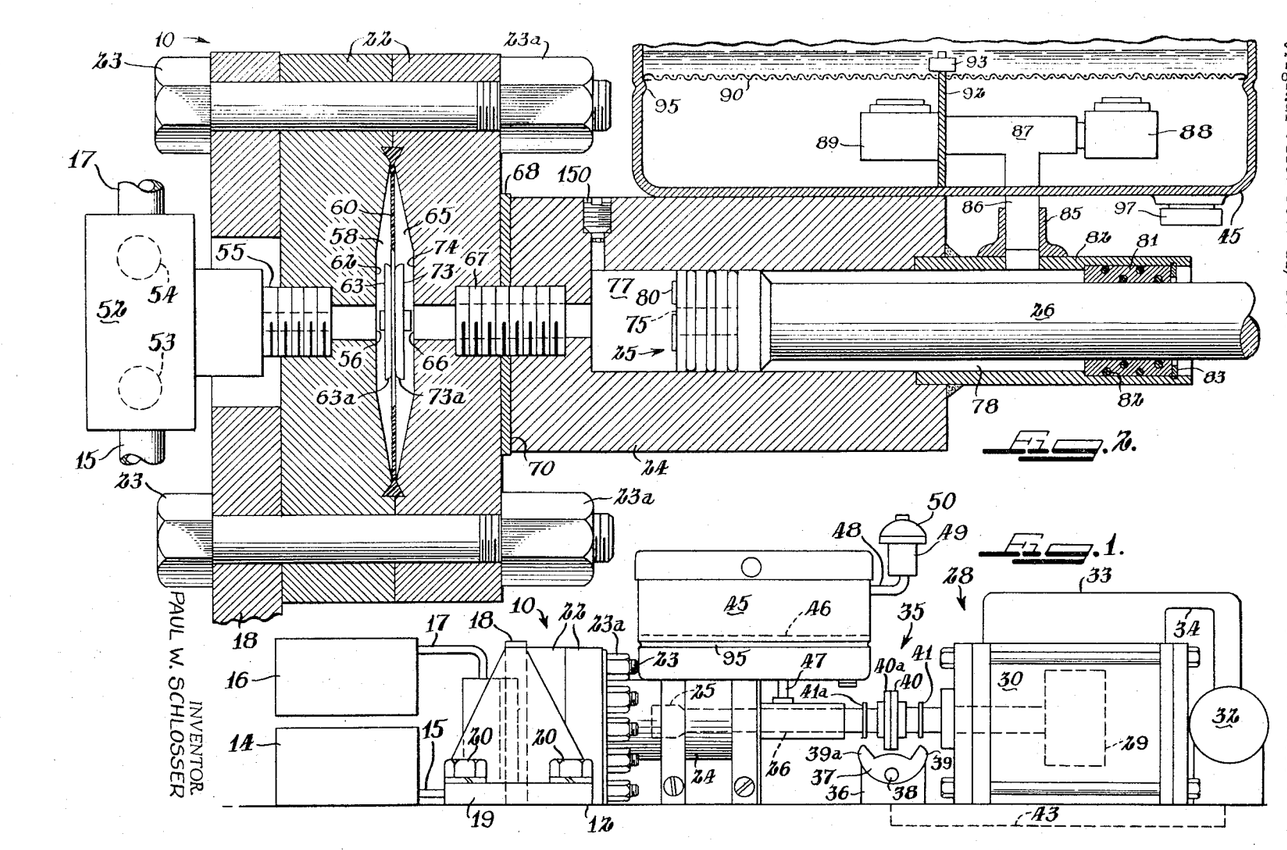
FIG. 1 is a schematic side elevational view of one modification of the present invention.

While the present invention has a number of applications to pressure operated equipment, the description below of the embodiment of FIG. 1 is of one application utilizing the present invention in pump equipment for apparatus for supplying material to an intermittently operated spray gun. In one specific use of the apparatus for supplying material to be sprayed to an intermittently operated spray gun, or the like, a substantial horsepower saving is effected when the gun is shut off because of driving liquid cyclic evaporation and condensation. Pumping liquid is caused to cycle between vapor and liquid phases by new valving apparatus to be described more fully below. Such cycling is inhibited by the apparatus when the pump is conditioned for delivering pumped fluid under pressure to further attain high pump efficiency while pumping.

As is well known, liquids are considered to be substantially perfectly elastic and practically incompressible. By way of example only, a pressure of one pound per square inch compresses ether, 1 part in 120,000 parts; water, 1 part in 300,000; and mercury only 1 part in 4,700,000. Other liquids have characteristic compression phenomena. It is preferred that oil and kerosene, ethylene glycol, oil alone, or a mixture of glycerines or alcohols with water be used in the pump to be described below. However, any known liquid having favorable non-corrosive attributes and reversible vapor and liquid phases can be utilized within the spirit of this invention. A present pump uses a mixture of four parts SAE #5 oil and one part kerosene, and it is assumed (though not ascertained) that only the kerosene contributes substantially to the cavitation phenomenon.

In a non-restrictive sense only, as one specific example of the use of cavitation in a pump, a friction brake and variably loaded lever apparatus test device was set up. A three-fourths horsepower rated commercially available squirrel-cage electric motor was attached by a speed reducing chain drive to a connecting rod for driving a pumping piston. The brake and lever apparatus was arranged to decelerate the motor by applying weight to act through a point on the lever and the following significant phenomena resulted.

With an oil driving liquid pump operating to supply a spray-gun of a given orifice size with a substantially uniform flow of water at a predetermined high pressure, it was found that a force of substantially twenty pounds acting at the point on the lever was required to brake and thus decelerate the motor.

With the spray-gun shut off, and the pump operating in the cavitation and condensation of driving oil phases, it required substantially fifty pounds of force to brake and thus decelerate the motor.

It is reasonable to assume that this latter fifty-pound force can be considered representative of the maximum mechanical efficiency of the given motor thus operated. Accordingly, depending on the size of orifice used and pressure of liquid, etc., supplied to a spray gun, or the like, and a suitable low-power-consuming drive motor at standby, a substantial saving in power is attainable. In view of the specific example above, it appears possible to save at least sixty percent of the power consumption for many adaptations of the invention.

Referring for details of construction first to FIG. 1, a preliminary design of a pump, generally indicated by the reference character 10, is shown diagrammatically as being secured to a suitable surface 12 such as on a web of an I-beam, or the like, which is of sufficient strength to react to relatively high forces while not permitting appreciable movement of the several parts of the apparatus now to be described.

The pump 10 is secured at the left-hand side thereof to the surface 12 by a plate 18 welded to end brackets 19, only one of which is shown, which brackets 19 are in turn bolted by bolts 20 to the surface 12.

The pump 10 is arranged to pump material from a source of material 14 fed through a pipe 15 to one side of a pumping diaphragm to be described below. A user of material 16, which may be any of several kinds of users, such as a spray gun, receives high pressure fluid through a pipe 17 after it has been compressed by the pump. Although not shown in this figure, an accumulator may be desired to reduce pressure fluctuations due to the intermittent action of a low number of pistons and correspondingly driven diaphragms. It is to be understood that more than one piston can be used in well-known manner to provide for substantially continuous high pressure, when desired.

The pump 10 comprises a housing made of a pair of halves 22 that may be substantially identical, as shown, in many applications of the pump 10. A heavy walled pump cylinder 24 cooperates with a piston 25 therein driven by a shaft 26 by a relatively large conventional piston rod 29 contained in a housing 30 of the hydraulic motor 28. The hydraulic motor 28 is cycled back and forth by hydraulic liquid pressurized by a suitably motorized oil compressor 32, or the like, which feeds and vents oil respectively through pipes indicated diagrammatically at 33 and 34. For use with a single acting piston 25, the piston 29 can be spring biased toward the right and only one hydraulic line 34 need be used, in known manner.

For double acting operation, with high pressure oil in pipe 33 the piston 29 will be driven toward the right and vented oil will pass through pipe 34 to a sump, not shown, in the hydraulic compressor 32. With high pressure oil supplied through the pipe 34 the piston 29 will be driven toward the left and return oil will flow through the pipe 33 back to the sump of the hydraulic compressor 32. The hydraulic motor 28 is suitably secured to the surface 12 by conventional structure, not shown.

To control reciprocation of the piston 29, and corresponding reciprocation of the piston 25 in the cylinder 24, a switching mechanism 35 may be employed. There is shown diagrammatically a switch 36 that is operated in one direction or the other by a cradle 37 mounted on an actuating rod in the form of a pivot 38, and having actuating arms 39 and 39a. A pair of adjustable flanges 40 and 40a may be spaced apart from the position shown between limiting snap rings 41 and 41a to change the length of the stroke of the pistons 29 and 25 in the position of the flanges 40 and 40a shown; the pistons 25 and 29 will have their maximum strokes. As the switching mechanism 35 is moved toward the left, the flange 40a will engage the arm 39a to reverse the switch 36, which through a conduit 43 can change over solenoid valves, or the like, and the hydraulic compressor 32 can cause high pressure oil to be fed through the pipe 33 which will reverse the direction of movement of the pistons 29 until such time as the flange 40 engages the arm 39 to vent the pipe 33 and cause high pressure oil to be fed through pipe 34 to cause the piston 29 to move again toward the right, which is the compression stroke for the piston 25, as will appear more fully below.

Oil or ethylene glycol, or other suitable liquid, is contained in a tank 45 which may be of relatively small volumetric capacity. For example, with a piston 25 of 1" in diameter, it has been found that substantially only a quart of liquid is needed with the piston 25 reciprocating through approximately a half-inch stroke at a rate of approximately 1,750 reciprocations per minute. These figures are exemplary only and it is contemplated that both higher and lower rates of reciprocation and different sizes and strokes may be more desirable for different pump uses. The driving liquid 46 is fed through a tube 47 to the interior of the cylinder 24 through structure to be described hereinbelow. The interior of the tank 45 is in communication with atmospheric pressure through a tube 48 connected to a filter 49 having a bonnet 50 to prevent dust and the like from entering into the tank 45. There is also a filter screen 46 within the tank 45 to further assure cleanliness of the driving liquid.

Referring now to FIG. 2, like reference characters refer to like parts. The source of material pipe 15 connects to double check valve 52 having an inlet check ball 53 and an outlet check ball 54 connected to the pipe 17 leading to the user of material 16, FIG. 1. The fluid to be pumped flows past the check valve 53 through a pipe nipple 55 through a valve port 56 into a pumping chamber 58 defined by the left-hand half 22 of the diaphragm pump 10 and a diaphragm 60 secured between the pump halves 22. Suitable high strength securements such as bolts 23 screwed to nuts 23a secure the pump halves 22 together on abutting faces 22a with a predetermined maximum tension in the bolts 23 to prevent separation of the faces 22a.

The valve port 56 has an extended preferably flat face 62 of at least a slightly lesser diameter than a valve disk 63, which is preferably flat on the left-hand face thereof to cooperate with the surface 62 for closing off the port 56 in a manner to be described more fully below.

The pumping liquid enters a pump chamber 65 on the opposite side of the diaphragm 60 which liquid is supplied through a port 66 through a nipple 67 securing the pump cylinder 24 to the right-hand external face of the right-hand half 22 of the diaphragm pump 10. There is preferably a gasket 68 of copper, or other suitable gasket material, between a flat face 70 at the end of the cylinder 24 for bearing on the surface of the pump half 22.

A flat faced valve 73 cooperates with a flat surface 74 for closing off the port 66. When either port 56 or 66 is closed in the presence of high pressure drive liquid or pressurized driven fluid, the diaphragm 60 will yield around curved or chamfered edges 63a and 73a of the valves disks 63 and 73, respectively, and accordingly the diaphragm will not be injured. The diaphragm 60 can therefore be very thin walled, and a thickness of polypropylene sheet material of between 20 to 40 thousandths of an inch have been used successfully without excessively stressing the diaphragms. It is to be understood that other plastics can be used; and the characteristic desired is that the plastics be tough in the presence of high pressures and corrosive materials, some of which may be heated substantially before being passed through the pump to attain desirable fluidity thereof, for example. As one specific example, the present pump is adaptable for pumping paint and the like wherein certain solvents are highly corrosive and, accordingly, other plastic materials than the above-mentioned plastics may be more applicable. As an example, such plastics as "Mylar" of various thicknesses have been used in such applications successfully.

The piston 25 is shown only diagrammatically in FIG. 2 and will be explained in detail in connection with FIGS. 4 and 5. A high pressure relief valve 75 for permitting flow of driving liquid from the chamber 77 to a lower pressure chamber 78 on the opposite side of the piston 25 is secured in the piston 25 in this modification of the invention. A liquid supply valve 80 is shown in the form of a reed valve 80 on the face of the piston 25 and also communicates with the chamber 78. The chamber 78 is closed by a sleeve 81 containing O-rings 82 for liquid sealing the shaft 26 and an extension sleeve 82 in the form of a piece of pipe. The sleeve 81 is suitably secured by a snap ring 83.

The extension sleeve 82 carried a weld saddle 85 in which a tube 86 is fitted, which tube 86 communicates with a T 87 connected to a check valve 88 for receiving fluid from the chamber 78 and expelling same into the tank 45 and an inlet check valve 89 for supplying liquid to the chamber 78. As the piston 25 reciprocates back and forth, and first toward the right, the liquid in the chamber 78 is driven up through the tube 86 and out through the check valve 88 into the tank 45. When the piston 25 is moved toward the left, liquid is drawn through the check valve 89, T 87 and tube 86 into the chamber 78. A filter screen 90 is supported on a partition 92 by a stud nut 93. The screen 90 is caused to fit snugly around an inwardly extended bead 95 so that the path of liquid in the tank 45 is up through the right half of the screen 90 and down through the left half thereof back to the chamber 78 in the sleeve 82. Accordingly, foreign material that may be in the system is exhausted through the check valve 88 and can be removed through a drain plug 97 periodically.

Figures 3, 4:
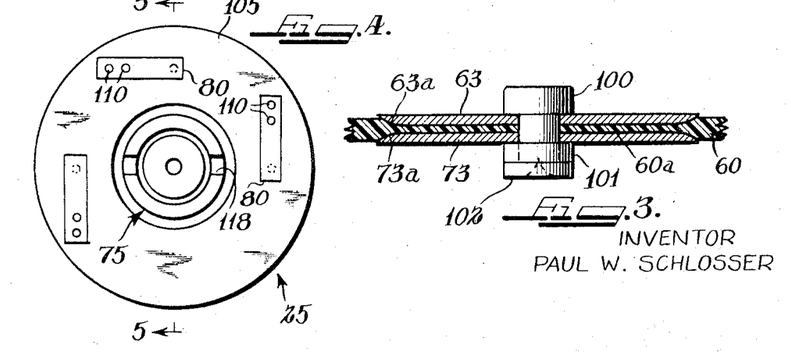
FIG. 3 is a further enlarged sectional detail view of an internal valve used in each of the modifications.
FIG. 4 is an end view of a pump piston.

Referring now to FIG. 3, a cross-sectional detail of the pump internal valve is shown for controlling a function of cavitation and condensation as well as reinforcing the center of the diaphragm 60. The valves 63 and 73 are preferably compressed into engagement with the diaphragm 60 which is shown in exaggerated compression in the central portion 60a. A rivet having a head 100 is passed through a ring 101 and the end of the rivet 102 is swedged into engagement with the ring 101 so that both sides of the valves 63 and 73 present substantially the same configuration so that the diaphragm cannot be inadvertently assembled improperly in the structure shown in FIG. 2, for example. The head 100 and the swedged end 102 are both sufficiently smaller than the ports 56 and 66 so that they can pass thereinto and not interfere with the seating of the valves 63 and 73 on the ports 56 and 66, respectively.

Figure 5:
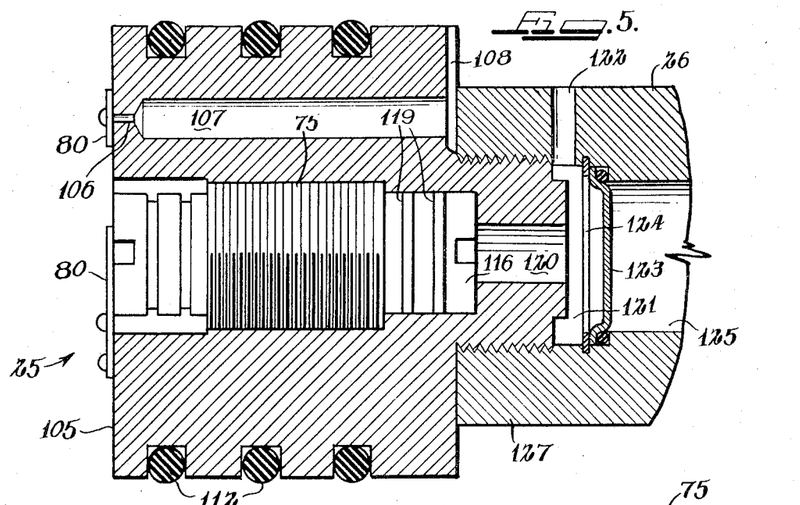
FIG. 5 is a cross-sectional view taken on line 5—5 of FIG. 4.
Figure 6:
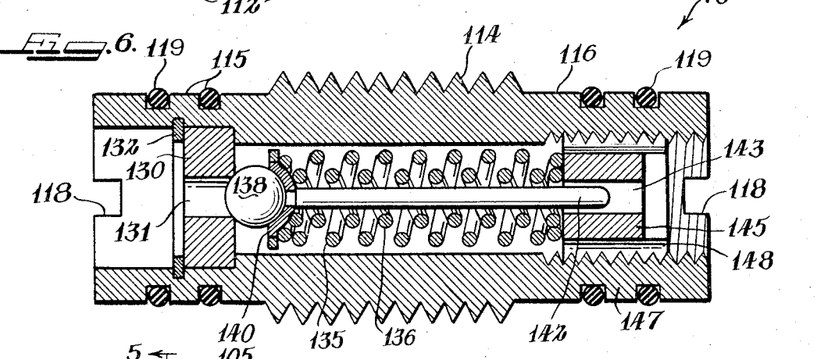
FIG. 6 is an enlarged sectional view of a relief valve used in this invention.

Referring now to FIGS. 4, 5 and 6, details of construction of the piston 25, the high pressure relief valve 75 and the reed valves 80 are shown. The face 105 of the piston 25 is preferably flat and contains at least one reed valve 80 for admitting low pressure liquid from the chamber 78 into the chamber 77 within the pump cylinder 24. Depending upon the size of the piston 25, it may be desirable to have more than one such reed valve 80 and three are shown in FIG. 4. Each reed valve 80 covers a small orifice 106 communicating with a passage 107 parallel to the axis of the piston in communicating with a milled slot 108 through which driving liquid may pass to the orifice 106. The reed valves 80 are secured to face 105 of the piston 25 as by small screws 110, or rivets or the like, in well-known manner. The bias closing these valves is very slight so that atmospheric pressure and the resistance to opening of the check valve 88 will suffice to open the inlet ports 106 to supply a very small amount of driving liquid to the chamber 77, FIG. 2, during a pump stroke.

The piston 25 includes a plurality of O-rings 112, or the like, which keep leakage around the piston at a practicable minimum. Three such O-rings are shown in FIG. 5, and more or less of same may be desired for different operation of the pump. The leakage around these O-rings is substantially the only leakage during normal high capacity pump operation and is very slight for a few strokes of the piston 25. However, after several strokes, sufficient leakage may occur so that the valve 73 will seat upon the port 66, FIG. 2, and accordingly the pressure of the driving liquid in the chamber 77 will become reduced at the right-hand end of the stroke of the piston 25 and accordingly cause the reed valve or valves 80 to be opened to introduce a minute quantity of driving liquid into the chamber 77 to keep the same at a substantially constant volume for normal desired volume pumping capacity and efficiency of the diaphragm pump 10.

The pressure relief valve 75 is shown in the center of the piston 25. The valve 75 is essentially in the form of a tube and may conveniently be formed from thick-walled tubular stock preferably having a rolled thread 114 which is left on the stock at substantially the central portion of the valve 75. The valve 75 is turned down at its ends 115 and 116 and contains at each end a cross kerf 118 to permit engagement by a suitable tool for screwing the relief valve 75 into position from either end thereof for a purpose to be set forth below in connection with FIG. 7. The ends 115 and 116 are adapted to receive O-rings 119 in one of these ends depending upon which end is inserted into the valve piston 25 or elsewhere.

The relief valve 75 illustrated in FIG. 5 is inserted into the piston 25 with the threaded portion 114 screwed into the center of the piston 25. The right-hand O-rings 119 seal the innermost end 116 of the valve 75 in a bore in the axis of the piston 25. High pressure liquid can pass through a passageway 120 to a passageway 121 in the shaft 26 and out of a cross drill 122 communicating with the chamber 121. A seal-off plate 123 is secured by a snap ring 124 to prevent oil from entering a hollow center 125 of the shaft 26 which is hollowed out to minimize weight and machining operations required to secure the piston 25 to the shaft 26, which securement is accomplished conveniently by threads 127.

Referring for details to FIG. 6, the relief valve 75 includes a valve seat 130, having a valve port 131 of substantially $3/32$ of an inch in diameter in this particular modification. A snap ring 132 secures the valve seat 130 in place against the bias of springs 135 and 136 which urge a ball 138 of approximately $1/8''$ diameter, for example, into engagement with the valve seat 130, which may be $3/32''$ in diameter. Both the ball 138 and the valve seat 130 are preferably made of highly abrasive resistant steel or ceramic, or the like, to have good wearing characteristics for intermittent valve operation. The ball 138 is guided by a shoe 140 connected with a valve stem 142 in turn guided to a port 143 in a spring biasing screw plug 145. The screw plug has side slots 147 therein, through which driving liquid can pass freely as well as through port 143. By this construction and arrangement the cross-sectional area of the port 131 will determine the relief pressure at which a ball 138 will permit high pressure liquid to pass from the chamber 77 to the chamber 78, FIG. 2.

The screw plug 145 has a kerf 148 by which the plug can be turned down upon the springs 135 and 136 to adjust the relief pressure determining movement of the valve 138. By using the left-hand O-rings 119, the valve 75 can be inserted into an adjustment fixture subject to fluid pressure and the screw plug 145 turned down until the valve 138 shuts off against such pressure. Thereafter, threads adjacent the screw plug 148 can be peened to maintain such adjustment. In this manner, accurately preset valves 75 are readily produced.

The springs 135 and/or 136 are not necessarily high force springs. For example, with a $3/32''$ diameter of the port 131, only about five pounds of spring force, or bias, acting toward the left in FIG. 6 is required to balance a pressure in the valve port 131 of 1,000 pounds per square inch. Thus a spring bias of approximately twenty-five pounds can offset a liquid pressure of 5,000 pounds, fifty pounds can offset 10,000 pounds, etc.

The valve 75 can also be used as a liquid supply valve by using a very low force spring, or springs, in place of the springs 135 and 136. To use the valve 75 as a driving liquid supply valve, the same will be inserted into the pistons 25 in the opposite direction than the position shown in FIG. 6 so that low pressure existing in the chamber 77 can cause the valve 138 to open to supply driving liquid to the chamber 77.

A plug 150, FIG. 2, serves the purpose of venting air out of the chamber 77, but can also be used for the insertion of a valve 75, if desired, so that either supply or venting of liquid to the chamber 77 can be attained in part external of the cylinder 24. This is particularly desirable where changing from one capacity to another of the pump is to be accomplished readily. In this case, relief valves 75 will occupy the place of the vent 115 so that same can be readily interchanged and placed in communication with the tank 45 so that vented liquid will be returned thereto, which return can be accomplished with obvious plumbing connections. It is to be understood that the relief valve installed in place of the plug 150 is subjected to atmospheric pressure on the outlet side thereof so that high pressure plumbing fittings are not required to make use of the device exterior to the pump.

PUMPING OPERATION

The modification of the liquid driven pump described above is adapted, as shown, for high pressure operation, in pressure ranges of several thousands of pounds per square inch fluid pressure, for example. Because of this desideratum, the drive shaft 26 is of large diameter to effect application of such high pressures. The walls of the cylinder 24 and the pump parts 22 are thick, accordingly, to resist bursting pressure, and particularly suddenly applied load pressures that can occur in liquid driven pumps.

The above modification is further adapted to be driven by a conventional hydraulic stroke motor 28, FIG. 1. Such stroke motors 28 may have variable or fixed strokes, for example, a 3¼ inch maximum stroke. The control mechanism 35 can limit the stroke between limits of 3¼ inch by adjustment collars 40 and 40a.

For the maximum stroke of 3¼ inches, with a 3 inch diameter piston 29, a pressure of 860 pounds per square inch in the pipe 34 will exert a force of approximately 6,100 pounds on the right side face of the piston 29, neglecting frictional losses, etc. The piston 25 in the cylinder 25 will exert a force of substantially 6100 pounds on the liquid on the left side thereof. With the piston 25 having a diameter of 1¼ inches, the volumetric displacement in a 3¼ inch stroke is approximately 4 cubic inches, neglecting liquid compressibility. The area of the face of the piston 25 is approximately 1.22 square inches, and the net pounds per square inch on the liquid and fluid in the pump 10 will be about 5000 pounds. The chambers 58 and 65 should have a maximum total volume of approximately 4 cubic inches for this pumping capacity; and such can be attained with a diaphragm of about 4 inches effective diameter having about ⅝ inch maximum travel, and being arranged substantially as shown in FIG. 2.

When lesser volumes are desired in pumping, the adjusting collars 40 and 40a, FIG. 1 can be positioned differently than shown. The collars 40 and 40a are conveniently secured by small set screws, not shown, which may be loosened to spread the collars 40 and 40a further apart. With such spacing, the fingers 39 and 39a will be caused to cycle the hydraulic stroke motor 28 through shorter strokes, and thus the piston 25 will be driven through correspondingly shorter strokes. The snap rings 41 and 41a define limits of adjustment for minimum volumetric capacity of the pump 10.

As will be pointed out hereinbelow in connection with FIG. 8, an adjustable linkage can be interposed between a power source such as an electric motor or the hydraulic stroke motor 28, and this linkage can accommodate a crank or stroke motor of a fixed length of stroke for different lengths of stroke of the driving piston 25 in the pump 10. When such arrangement is used, it is preferred that the high pressure relief valve 75 be exterior of the sleeve 24 and placed in the position of the vent plug 150, FIG. 2, for example. In such position, the relief valve 75 can be exchanged for higher pressure relief functioning at shorter strokes of the piston 25 so that a pump 10 can be arranged to operate at higher pressures but lower volumetric capacity, which pressures are determined by the user 16 of the material and limited by the relief valve structure 75. Accordingly a fixed horsepower motor can operate the pump at different volumetric capacities and different fluid pressures.

Figure 7:
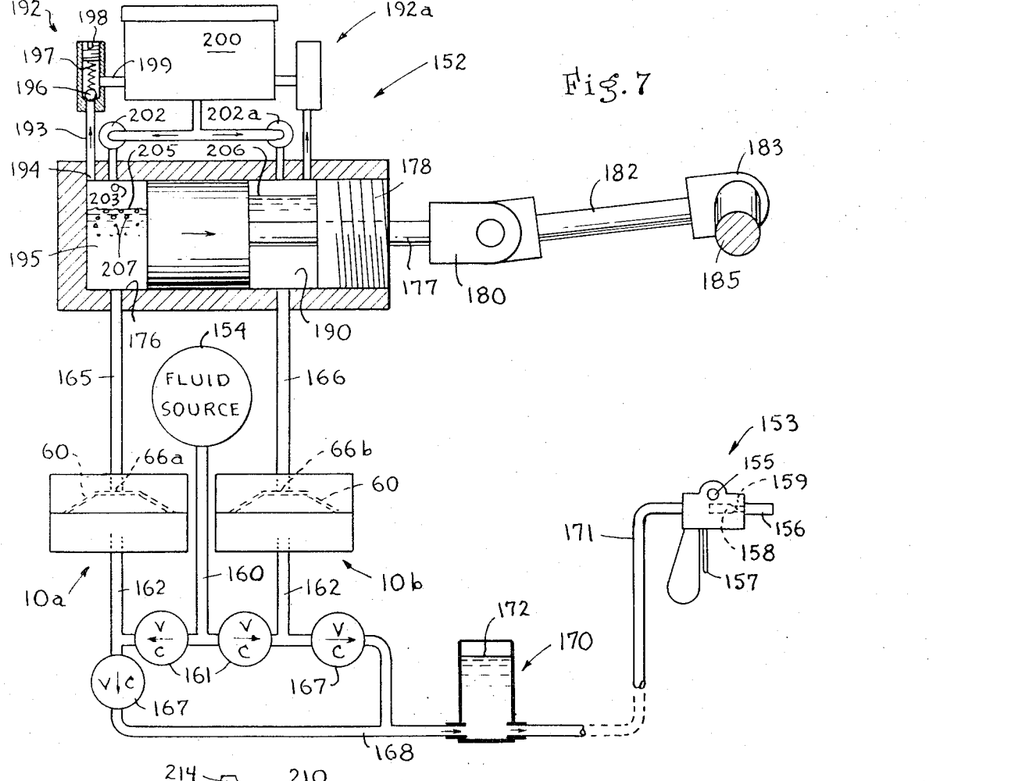
FIG. 7 is a diagrammatic view, with parts in half section, of another modification of the invention.

Referring now to FIG. 7, another modification of the invention is indicated generally at 152. This modification is more particularly adapted to operate at lower pressures, for example, in a range of 1000 to 2000 pounds per square inch output, although it can operate at higher or lower pressures with suitably designed parts therefor. A spray gun, or the like, 153 is adapted to receive fluid from a fluid source in the form of a tank 154, or the like, which has a suitable gravity pressure head thereon to operate the diaphragms 60 in pumps 10a and 10b which may be identical in all respects to the pump disclosed in connection with FIGS. 1, 2, et seq., except that the control means are removed from the piston and cylinder in this modification for reasons to appear more fully below.

The spray gun 153 may be of any commercially available high pressure type and is shown in the form of a gun having a valve housing 155, an outlet nozzle 156 and a trigger 157 for operating a valve 158 which cooperates with a valve port 159. The valve 158 may be spring biased towards closed position and opened by pressure towards the left on the trigger 157.

The fluid source 154 may be filled with paint and suitable solvent and be fed through a supply pipe 160 through either one of identical check valves 161 to either of the pumping chambers, not shown, in the diaphragm pump parts 10a and 10b through identical supply pipes 162. As the diaphragms 60 are driven downwardly by pressure of driving liquid in pipes 165 and 166, respectively, the paint, or the like, will be driven through one or the other identical check valves 167 into a manifold 168 through an accumulator 170 into a flexible supply tube 171 connected with the spray gun 153. The accumulator 170 may be an air accumulator and has a liquid level 172 which may rise and fall to a certain extent within acceptable pressure variations, to be mentioned more in detail below.

The pump 152 is of the double acting type and has a piston 175 reciprocated in a cylinder 176 by a piston rod 177 extending out through a suitably sealed plug 178. The seals of the piston and the plug 175 and 178, respectively, have not been shown inasmuch as they can be of the kind pointed out above. The piston rod 177 is attached to a clevis 180 in turn connected by a pivot 181 to a connecting rod 182 journaled at 183 on a rotating crank 185 that can be turned by an electric motor either directly or through reduction mechanism, not shown, when such is desirable. A variable linkage for driving this modification of FIG. 7, as well as the modification shown in FIGS. 1 and 2, will be explained below in connection with FIG. 8.

The piston 175, of the modification shown in FIG. 7, has preferably a short stroke of reciprocation. As a specific example, and not to be construed in a limiting sense, the piston 175 may have a cross-sectional area of substantially one-half of a square inch and can be moved through a stroke of substantially ½ inch and thus have a capacity of ¼ of a cubic inch of driving liquid for each direction of reciprocation of the piston 175. It is to be understood that the cross-sectional area of the piston rod 177 is subtracted from the volumetric capacity of the right-hand chamber 190 of the pump 152. However, the total for a complete rotation of the crank 185, in this example, can be made to be substantially one-half of a cubic inch.

At approximately 462 r.p.m., the volumetric maximum capacity of the pump 152 will be 231 cubic inches per minute or approximately one U.S. gallon. This represents a rather high quantity for painting purposes; but is not excessive for cleaning, or blowing semi-liquid plaster, or the like. Lower capacities for the pump can conveniently be attained by adjusting the piston 175 to linkage of a kind to be described below in connection with FIG. 8 to reduce this capacity from the maximum capacity illustrated in FIG. 8. At this maximum capacity, it is preferred that a relief valve generally indicated at 192 be adjusted to operate at a minimum relief pressure so as to prevent motor burn-out when the pump 152 is arranged to deliver maximum capacity.

The relief valve 192 may be of the type of relief valve 75 shown and described above in connection with FIG. 6, but is shown adjustable in diagrammatic representation in FIG. 7. The relief valve 192 is connected by a high pressure pipe 193 with a port 194 in communication with the end chamber 195 of the pump 152. A ball valve 196 is biased by a spring 197 adjusted by a set screw plug 198. A low pressure pipe 199 is connected to a liquid supply tank 200 in communication with atmospheric pressure, such as explained in connection with FIG. 1, for example, or by other suitable construction. A check valve 192a may be identical to the check valve 192. The check valves 192 and 192a are arranged to open in the presence of high pressure in the liquid in the chamber 190 and 195 to vent the liquid into the tank 200. If, for example, the pump is operating at 1,000 pounds per square inch delivered pressure, it may be desirable that the check valves 192 and 192a be adjusted to open at approximately 100 pounds in excess of such value or at 1100 pounds pressure so as to prevent unnecessary opening and closing of the ball valves therein as a result of small shocks occurring in the driving liquid when the pump is operating at maximum or other desired pumping capacity with the spray gun 150 in its "on" position with the valve 158 opened.

A pair of low pressure check valves 202 and 202a supply makeup liquid in small quantities, for examples, as indicated by a drop 203 shown falling into the chamber 195 supplied from valve 202 which can occur with the piston 175 moving toward the right when the spray gun 153 is shut off. The check valve 202a may supply a drop of liquid also when the piston 175 moves toward the left when the spray gun is shut off. The drops are supplied at sufficient rate so that it will take only a few seconds to make up the quantity of driving liquid in the chambers 190 and 195 when the spray gun 153 is operated to "on" position. Upon being actuated to "on" position, the spray gun 153 will initially receive fluid to be sprayed from that accumulated in the accumulator 170 at a high fluid pressure level 172. It is preferred that the supply rate of drops 203 be such that the accumulator pressure does not fall substantially below that desired for proper spraying operation of the spray gun 153. After spray gun value 158 is opened a short time, the piston in the pump 152 driven by crank 183 (FIG. 7) will begin to act on predetermined maximum quantities of liquid in the chambers 190 and 195 to cause positive drive of the diaphragms 60 between desirable limits of movement thereof and may be adjusted to act between different limits of stroke of the pistons 175 by using the linkage arrangement of FIG. 8 to control the movement of the diaphragms 60. Thus, movement of the diaphragms 60 will cause the fluid in the accumulator 170 to be replenished and the gun 153 supplied adequately as long as valve 158 of the spray gun remains open.

With the chambers 190 and 195 full of driving liquid, not shown, the diaphragms 60 in the diaphragm pumps 10a and 10b will be driven through the maximum travel thereof and each will function substantially in an identical manner. For example, considering the diaphragm 60 for pump 10a with the piston 175 moving towards the left, the diaphragm 60 for pump 10a will be driven downwardly by pumping liquid movement through the pipe 165. Also, fluid in the pump 10a on the lower side of the diaphragm will be driven downward through pipe 162, check valve 167 to the manifold 168, the accumulator 170 and the tube 171 to the spray gun 153. At the same time, fluid is fed from the fluid source 154 through pipe 160, the right-hand check valve 161 and pipe 162 to the pump 10b. With the spray gun on, successive cycles will continue to supply driven fluid through the spray gun 153 and there will be surges in the liquid level 172 in the accumulator 170 to integrate pulsations within rather narrow pressure fluctuations in the driven fluid.

STANDBY CAVITATION OPERATION

When the spray gun 153 is operated to off position and the valve 158 engages the valve port 159, the following phenomena will result. The pressure of the fluid in the fluid source is such, either due to gravity or pressure applied to the fluid, to prevent cavitation through the inlet check valve 161 and the several connections leading to the diaphragm pump parts 10a and 10b. Accordingly, on reciprocation of the piston 175, fluid will be drawn into the pumps 10a and 10b and the diaphragms will raise until the valves therein engage ports 66a and 66b, as shown in dotted lines, FIG. 7. The fluid level and pressure in the accumulator 172 will rise until such time as the relief valves 192 and 192a are caused to open to expel driving liquid out of the driving chambers 190 and 195. Accordingly, the liquid levels in the chambers 190 and 195 will be lowered to average positions 205 and 206 determined by the length of the stroke of the piston 175. With piston 175 moving in the direction of the arrow thereon, the liquid in chamber 195 can attain sub-atmospheric pressure, for example, and the drop 203 will be forced into the chamber 195 by atmospheric pressure. The liquid in the chamber 195 is shown as containing bubbles of vapor 207 forming cavities in this liquid. The liquid in chamber 190 is shown solid and the liquid level 206 thereof is accordingly rising toward the top of the chamber 190.

In the process of cavitation of the liquid in the chambers 190 and 195, which liquid may be oil or ethylene glycol, for example, it is theorized that the liquid therein will be instantly cooled due to heat exchange of latent heat of evaporation thereof at a low pressure level in these chambers 190 and 195. This is considered an advantage of this invention, inasmuch as prior pump practice has been to by-pass the driving liquid when the spray gun is in "off" position; and has involved the highest expenditure of horsepower when the spray gun 153 is in its "off" or non-operating position when a high level of power is not desirable for reasons pointed out at the beginning of the specification.

It is theorized that, because the power required for causing evaporation and condensation of liquid in the chambers 190 and 195 is only of relatively low horsepower, and further because the latent heat of evaporation and condensation heat gain exists in a decaying heat transfer system, that is, there is heat loss from the vapor during pressurized condensation of same through the walls of the pump 152 and associated metal parts, the pump and pumping liquid are not heated, i.e. are cooled, during periods when the valve 158 of the spray gun 153 is closed. Accordingly, the quantity of liquid required to be maintained in the tank 200 for operation of the pump during periods when the valve 158 of the spray gun is closed is very low and can be on the order of a quart or less for small pumps operating paint spray guns and the like.

When a stroke of the piston 175 is completed (during continuing reciprocation of the piston during standby periods) at 90 degrees clockwise from the position shown for the crank 195, the piston 175 is reversed in motion and the driving liquid in the chamber 195 will be subjected to pressure and condense and this liquid level 205 therein rise. During reciprocation of the piston 175 in periods when the valve 158 of the spray gun is closed the drops of liquid 203 will cause a replenishment of the volume of driving liquid at a predetermined rate in both of the chambers 190 and 195 during this time. As mentioned above, it is preferred that this rate be sufficiently rapid so that, when the valve 158 of the spray gun 153 is opened, the excess fluid in the accumulator 170 can supply the needs and capacities of the spray gun 153 during replenishment of the volume of liquid in the chambers 190 and 195 to a desired full capacity for the pump 152 and the diaphragm pumps 10a and 10b. Of course, when the valve 158 of the spray gun 153 is again closed the diaphragm actuated valves 66a and 66b will again be closed, driving liquid in chambers 190 and 195 will again be expelled through relief valves 192 and 192a into the supply tank 200 in successive reciprocal strokes of the piston 175.

While not shown, for extremely high pressure operation, pre-set mechanical accumulators can communicate with the chambers 190 and 195 and be set at suitably higher pressures than the relief valves 192 and 192a whereby to prevent excessive shock upon structural parts. Such practice is considered obvious and accordingly not shown. However, it is desired that the valves 192 and 192a have sufficient capacity to thus expel the fluid in single reciprocations of the piston 175.

Figure 8:
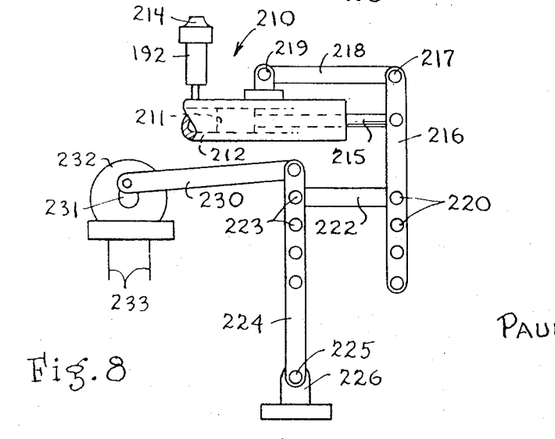
FIG. 8 is a diagrammatic view of adjustable drive linkage usable with each of the modifications.

Referring now to FIG. 8 which illustrates a linkage arrangement for varying the pressure and volumetric capacity functions of the pump, a single acting pump 210 is shown and includes a piston 211 operating within a cylinder 212. A relief valve 192 is shown diagrammatically and this relief valve may be conveniently of the pre-set type explained in connection with FIG. 6 and attached to an outlet 214 to a supply tank, not shown. The piston 211 is driven by a piston rod 215 moved by a lever 216. The upper end of the lever is pivoted at 217 and a tension link 218 pivoted on a bracket 219 that can be suitably secured to the pump 210. The lower leg of the lever 216 has a series of spaced holes 220 to accommodate suitable pins to secure a tension link 222 in turn secured by pins in holes 223 to a rocker arm 224 in turn pivoted at its bottom 225 on a suitably secured bracket 226. The rocker arm 224 reciprocates to the right and left under influence of a connecting rod 230 shown as being driven by a crank 231 rotated by an electric motor 232 supplied from the source of power 233. The rocker arm can also be moved by a hydraulic motor such as shown in FIG. 1, if desired.

The pump 210 is shown as operating at its maximum capacity inasmuch as the tension link 222 is connected at the uppermost hole 223 in the rocker arm 224 and likewise in the uppermost hole 220 in the lever 216. Accordingly, the pressure relief valve 192 is set to operate at its lowest desired pressure because the piston 211 will have maximum movement as it reciprocates. Where lower volume and higher pressure driving functions are desirable, the tension link 222 can be moved to lower holes 220 and 223 to provide lesser movement of the piston 211 as it reciprocates. In this later event it is preferred, when higher pressures are to be used at substantially a constant horsepower input to the motor 232, that the pressure relief valves 192 be replaced with higher pressure adjusted relief valves.

MODIFICATION OF FIGS. 9–14

A presently preferred embodiment of the invention will now be described with reference to FIGS. 9–14. This form of the invention is adapted for portability, which is a desirable attribute when spraying paints and the like. Certain of the parts to be described can be made conveniently of aluminum in order to maintain strength while attaining light weight. With such construction it has been found that a pump having a capacity of about 40 gallons of paint per hour at about 2,000 p.s.i. has a weight of substantially less than 100 pounds and is readily portable by the average painter for short distances, and can be equipped with a wheeled dolly for transporting same for longer distances.

Figures 10, 11:
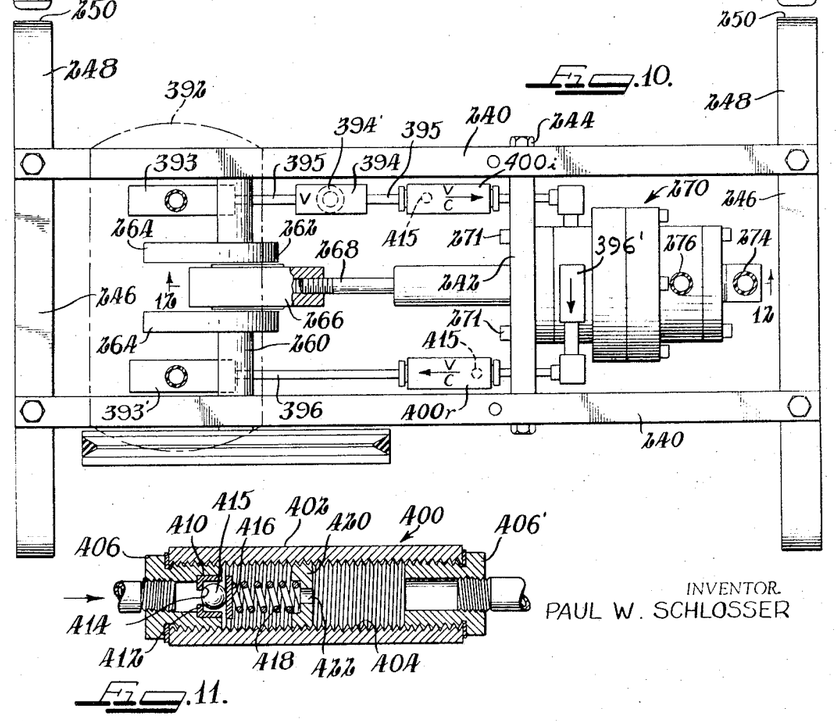
FIG. 10 is a plan view of FIG. 9.
FIG. 11 is a detail sectional view of a check valve used in this last mentioned modification.

The frame comprises a pair of spaced apart channel beams 240 which may conveniently have their flanges extending inwardly in the position shown in FIG. 10. The beams 240 are connected together by a transverse bolster plate 242 which is suitably secured by machine screws 244 suitably threaded into edges of the bolster plate 242. The ends of the beams 240 are connected together by cross bars 246 adjacent the top flanges of the beams 240 and also suitably screwed thereto. Screw connections are preferred, although not required, to facilitate ready assembly and disassembly of the structure for replacement of parts and repair. The bottom flanges of the beams 240 are connected to cross bars having cantilever extensions 248 and downturned legs 250 that may carry suitable vibration-absorbing pads, not shown.

A commercially available electric motor 254, of three-quarter or one horsepower nominal capacity, is shown secured by machine screws 255 to the top flanges of the beams 240. The motor is a 120 volt motor preferably sized to conveniently accommodate widely available electric power. The motor 254 turns a pulley 256 which through conventional belting 257, or the like, turns a speed reducing pulley 258 to in turn rotate a crank shaft 260. The crank shaft 260 turns a crank 262 (FIG. 10) which has counterbalancing weights 264 to maintain vibration at a tolerable minimum. The shaft 260 is journalled at spaced apart points on bearings mounted to the beams 240, which bearings are not shown, being of conventional type.

The crank 262 connects to a conventional crank bearing within a housing 266, which housing is tapped as indicated to receive a threaded end of a connecting rod 268. As the crank 262 rotates, the rod 268 is cycled back and forth through 360 degree cycles to the right and left, as viewed in FIGS. 10 and 12. The connecting rod 268 is attached to a piston, to be described more fully hereinbelow, to drive a diaphragm pump generally indicated by the reference character 270. The diaphragm pump 270 is connected to the bolster plate 242 by a number of suitable elongate machine screws 271, which screws also serve to secure parts of the pump 270 in position in the frame.

Figure 9:
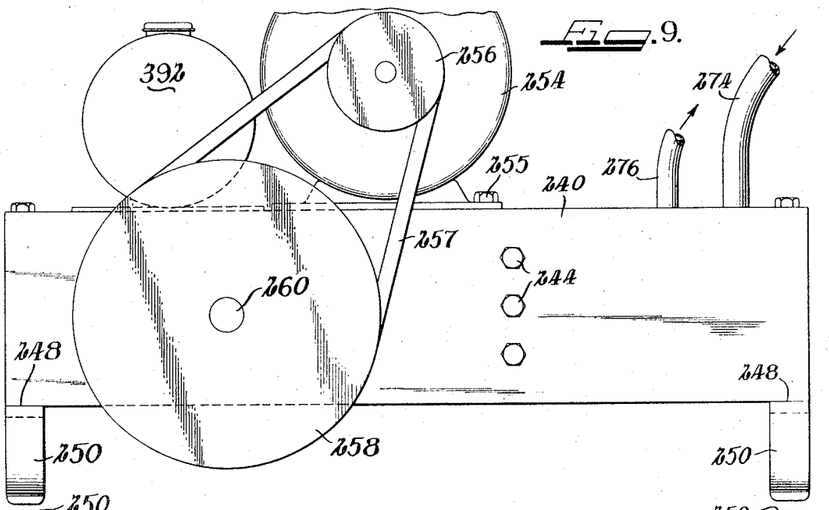
FIG. 9 is a side elevational view of a presently preferred modification of the invention.
Figure 12:
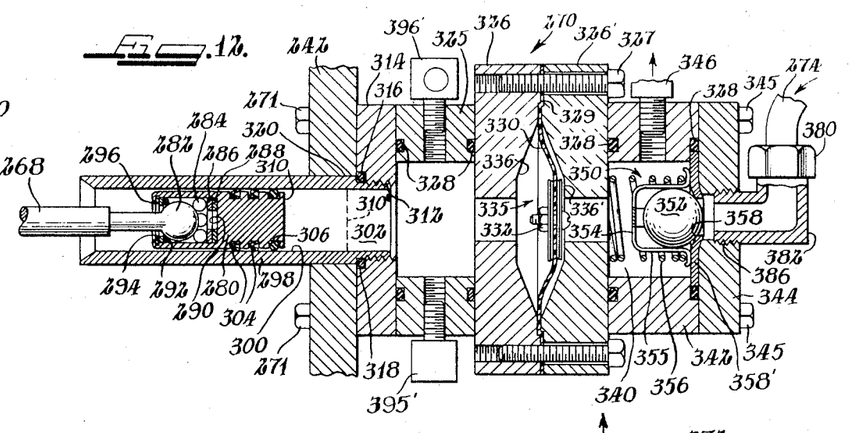
FIG. 12 is a sectional view taken generally on line 12—12 of FIG. 10.

Actuation of the pump 270 is adapted to cause paint, or the like, to be supplied into the pump 270 from a suitable conduit 274 shown at the right-hand side of FIGS. 9, 10 and 12. The paint is caused to exit through a high-pressure conduit 276 to a paint spray gun, or the like, or other user of high-pressure fluid.

FIG. 12 shows a presently preferred construction of the pump 270 described briefly immediately above. The connecting rod 268 is adapted to drive a piston 280. The end of the connecting rod 268 is equipped with a ball end 282, or can have a suitably formed hard insert ball. The ball end 282 is arranged to bear upon a plurality of radially spaced apart ball bearings 284. The bearings 284 in turn ride on a steel washer 286 backed up with a relatively softer metal washer 288 or distribute force on the shoulder 290 of the piston 280, which piston is preferably fabricated from aluminum. The ball end 282 is secured in place with an O-ring 292 which is secured by a steel washer 294a and held in place by a snap ring 294 in a groove 296 of the left-hand end of the bore in the piston 280.

The piston 280 reciprocates back and forth internally in a cylinder 298 having a bore 300.

As the piston 280 reciprocates the face 310 moves from the solid line position shown to a right-hand position 310' to compress and drive liquid, not shown, and moves back again to the solid line position on a suction stroke. It is preferred that the bore 300 have a smooth finish whereby to minimize wear on high pressure seals 304 and 306, now to be described.

The seals 304 are U-cross-sectioned gaskets with the open side of cross section of the gaskets facing the high pressure liquid within a pumping chamber 302. The O-ring 306 serves to seal and also physically center the right-hand end face 310 of the piston 280. The pressure drop across the O-ring 306 is approximately one-half the pressure drop from the high pressure within the pumping chamber 302 during the driving stroke, and the pressure drop across the right-hand U-shaped cross section gasket 304 is approximately the other half. High pressure liquid at a lower pressure than the maximum pressure in the chamber 302 will remain entrapped between the U-shaped gaskets 304 and the O-ring 306 to provide continuous lubrication. It has been found that this structure will leak a negligible amount of oil over a long period of operation. For extremely high pressures, more gaskets 304 and O-rings 306 than shown can be used, and for lower pressure operation it is feasible to use fewer than the number of gaskets and O-rings illustrated in FIG. 12.

The cylinder 298 is secured by mated threads 312 in an end plate 314 for the pumping chamber 302 of the pump 270. In this embodiment of the invention the threads 312 need not be liquid-tight inasmuch as an O-ring 316 is adapted to cooperate with mating surfaces adjacent a shoulder 318 of the parts 314 and 242 and also with a shoulder 320 on the part 242 whereby the O-ring 316 will seal against pressure leakage both radially between the parts 242 and 314 as well as axially between the part 242 and the external surface of the cylinder 301.

This liquid pumping chamber 302 is laterally confined within a heavy walled ring 325. The ring 325 is secured to a half 326 of the pump 270 by the elongate screws 271 which pass through suitable holes in the bolster plate 242, the end plate 343, the pumping chamber ring 325 and are threaded into the pump half 326.

A substantially identical pump half 326' is secured by bolts 327 to the pump half 326 to secure between slightly offset shoulders, generally flat extending faces adjacent the shoulders 328 to secure a diaphragm 330 therebetween. The diaphragm 330, by a bolt assembly 332 or the like, secures centrally arranged diaphragm operated valve structure 335 which may be identical to valve structure described hereinabove in connection with previously described modifications of the invention. The valve structure 335 is arranged to cooperate with flat valve faces 336 and 336' to define the limits of movement of both the valve assembly 335 and the diaphragm 330 in the same manner as described more fully above.

A pumped fluid chamber 340 is defined by a heavy walled ring 342 secured by a closure end plate 344 by suitable machine screws 345 cooperable with the pump half 326'. The pumping chamber 340 communicates with an outlet fitting 346, in turn connected with outlet valve parts to be described below and connected in turn with the high pressure hose 276, FIGS. 9 and 10.

An inlet valve structure 350 is located inside of the pumping chamber 340 in this modification of the invention. The inlet valve 350 is shown in the form of a ball check valve 352; the ball may be of nylon or other suitable material, and is preferably of light weight to have low inertia values as it moves away from and back to a valve seat 358. The valve ball 352 is confined in a spider 354 having guide legs 355, of which there are preferably at least three equally spaced around the ball and adapted for guiding the ball as it moves to and from the seat 258. The spider 354 with the ball 352 therein is biased by a low force spring 356 between outturned distal ends of the spider 354 and the right-hand central surface of the pump housing half 326. The valve seat is in the form of a centrally perforated round plate 358' secured between a shouldered flange in the ring housing member 342. O-rings 328, identical to those described previously, are placed in suitable annular grooves positioned to seal the pumping chamber 340 against axial leakage of fluid.

On left-hand movement of the diaphragm 33 and the associated diaphragm valve structure 335 due to reciprocation of the piston 280 in a leftward direction, fluid at low pressure is introduced into the tube 274 through the fitting 380 to urge the ball valve 352 toward the left to cause the pumped fluid to enter the pumping side of the diaphragm 330 in the pump 270. On right-hand movement of the piston 280 the pumped fluid is caused to pass out of the fitting 346 and the ball 352 will at such times seat upon the seat 358 under the combined influence of fluid under pressure and tension of the spring 356.

Figure 14:
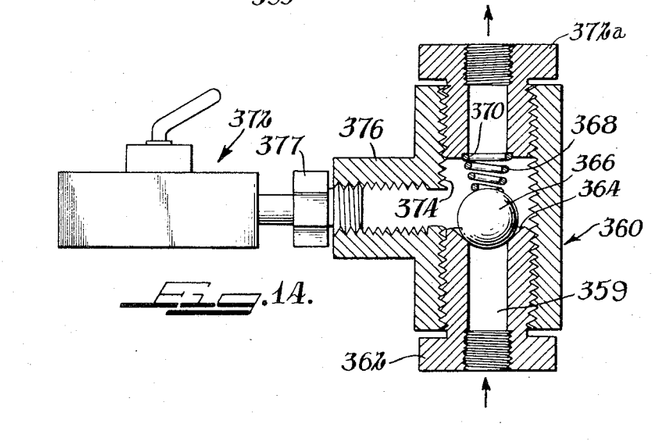
FIG. 14 is a sectional detail view of a pumped fluid check valve.

FIG. 14 shows the fluid outlet valve 360 for the pumped fluid which connects with the fitting 346 (FIG. 12) through a suitable valve seat fitting 362. Fluid under pressure enters the valve seat fitting 362, which fitting is provided with a tapered valve seat 364 at its upper end, in the position shown. A suitable ball 366, which may be of nylon or the like, is urged by a spring 368 in a downward direction, in the position shown in FIG. 14. The spring 368 seats in the seat 370 in a fitting 372. It is to be noted from the drawings that the fitting 360 is of T form and that the threads cooperable with the fittings 362 and 372 are the same pitch and pass entirely through the fitting so that the same can be fabricated in a single machine setup for drilling and tapping threads 374. The T fitting includes a side boss 376 which is drilled and tapped to receive a fitting 377 in turn connected to a material bleed valve 372. The bleed valve is of commercially available kind, and is opened when the pump is started up to express air out of the pump 270 until such time as pumped fluid appears at the outlet of a tube, not shown, connected to the material bleed valve 372.

Figure 13:
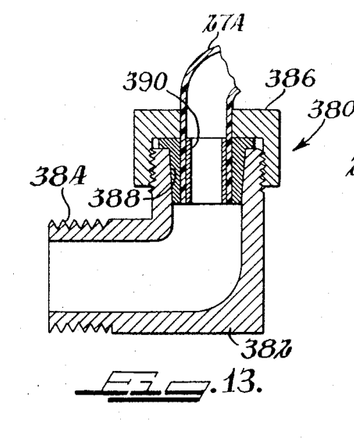
FIG. 13 is a sectional detail view of a pumped fluid inlet connector.

The fluid inlet fitting 380 is shown in enlarged section in FIG. 13. The fitting 380 comprises an elbow body 382 having pipe-threaded male threads 384 to make a fluid tight fit with female threads 386, FIG. 12. The other end of the elbow 380 is adapted to receive a bonnet nut 386 to compress a tapered bushing 388 so as to squeeze the distal end of the tube 274 against an internal bushing 390 to provide a fluid tight seal at the inlet side of the elbow 380.

The pumping liquid circuit will now be described. The liquid is stored in a tank 392 which is suitably mounted for gravity feed as illustrated in FIG. 9 atop the beams 240 and spanning same. The tank 392 in this modification is preferably of relatively small capacity because it is required to accommodate only little bypassed fluid. The tank 392 may have a suitable internal filter, not shown, to keep foreign materials out of the pumping liquid. The pumping liquid may be connected through conventional shut off valves 393 and 393' from the supply and purged sides of the pumping liquid system in the pump 270. Pumping liquid is supplied through several tubes and connectors indicated generally by reference characters 395 on the low-pressure side and 396 on the high-pressure purged side of the system. A metering orifice 394, or a needle-type valve, are each commercially available. If the needle-type valve is used it may be provided with a knock-off adjustment handle 394' that may be removed after proper setting to supply a metered supply of pumping liquid through an inlet check valve 400i to the pumping system to prevent tampering.

As best shown in FIG. 12, the inlet fitting 395' is mounted adjacent the bottom of the pumping chamber ring 325 to introduce oil into the bottom of the pumping side of the pump 270. As also shown in FIG. 12, the outlet fitting 396' is located at the top so that any air within the pumping liquid side of the system is first purged, before oil is purged from the system. Upon starting up the system the pumping liquid side of the pump 270 is purged of air automatically by gravity.

When the outlet valve 158 of the spray gun, connected to the pumped fluid outlet tube 276, is closed, paint is still drawn into the pumped fluid chamber and, because of the pressure rise in the pumped fluid chamber above the pressure in the pumping fluid chamber, the diaphragm valve structure 335 and the diaphragm 330 will move toward a position opposite that shown in FIG. 12. Upon engagement of the valve structure 335 with the seat 336 there is a fixed minimum volumetric capacity of the diaphragm pumping chamber 302, and the quantity of pumping liquid in excess of the minimum volumetric capacity of the chamber 302 is caused to be purged out of the fitting 396' through the check valve 400r to the tank 392.

With the pumping chamber 302 and liquid communicating passage in the pump purged of such excess of pumping liquid, cavitation operation of the pump will ensue with the pumping liquid cyclically being vaporized and condensed by the pressure changes in the pumping chamber caused by reciprocation of the piston 280 to effect a reduction in horsepower drawn by the electric motor 254, and cavitation cooling of the liquid in the pump and pumped parts as explained more in detail hereinabove.

Structure of a preferred check valve, for both valves 400i and 400r, is indicated generally at 400 in FIG. 11. The check valve 400 comprises a generally tubular body 402 provided with uniform threads 404 throughout its entire interior length. The threads are adapted to receive at one end a fitting 406 and at the other end a fitting 406' both having threads that mate with the threads 404. The fitting 406' may connect either to an inlet or to an outlet pipe or tube depending upon which direction of liquid flow is controlled by the check valve 400. The fitting 406 is internally counterbored to receive a valve sleeve 410 having an inwardly extending flange 412 providing a valve seat 414. The seat 414 is adapted to mate with a ball 415, which ball may be of steel or other suitable material. The ball 415 is engaged by a plate 416 biased by a spring 418, which spring bears against and is adjusted by a centrally perforated adjustment bushing 420. The central aperture of the bushing 420 may be provided with an irregularly shaped liquid passage port 422 to receive a suitable tool for adjusting the compression of the spring 418.

When the check valve 400 is to be used as the inlet valve 400i for pumping liquid, the tension on the spring 418 is kept at a very low value whereby atmospheric pressure acting upon the ball 415 can overcome the tension of the spring 418 to admit metered pumping liquid flow in the direction of the arrow at the lefthand side of FIG. 11. As mentioned briefly above, it is desired in this preferred modification of the invention for portable spray painting apparatus that approximately 20 cycles of the piston 280 will be required to provide enough pumping liquid to enable the diaphragm pump for full stroke fluid pumping operation. It is to be understood, of course that, with different orifices in spray guns, different quantities of fluid are required to be sprayed with different spray guns; accordingly there will be occasional purging and refilling of pumping liquid as the valve mechanism 335 attains engagement with one or the other seats 336 and 336' as it reciprocates within the diaphragm chamber of the pump 270. In actual operation, purging and supply functions are more or less erratic depending upon the operation of the spray guns. Longer periods of operation of a spray gun, without intermittent shutting off thereof, will cause a different pattern of purging and refilling than frequent small applications of paint from the spray gun, with relatively longer standby times therebetween, at which standby times the driving liquid in the pump is in operation with the cavitating function.

CAVITATION COOLING

When pumping paint at 2,000 p.s.i., for example, and the spray gun is then shut off, during a pressure stroke of the piston 280 a shock load will result, which load can approach 4,000 p.s.i. By using a suitably set relief valve 400r the pumping and pumped liquids can be held to a maximum pressure between 2,000 p.s.i. and 3,000 p.s.i. (about 2,500 p.s.i. for example) when the back center plate-valve on the diaphragm 330 seats against the seat 336 to confine the pumping liquid to an exact minimum quantity when the pumping piston 280 is in its most extended thrust stroke position 310'. The oill will be compressed a small percentage of its volume depending on the pressure applied thereto by the pumping piston 280.

At suction or return stroke of the piston 280, as presently theorized, although not fully ascertained, it is thought that the pressure of the driving liquid, usually oil, in the pumping chamber 302 will drop instantly to nearly absolute zero pressure. It appears that the sudden expansion of the oil during the return or suction stroke of the piston will cause instantaneous varporization of some of the oil, in the pumping chamber, heat of the oil being given up to the vapor and the temperature of the oil being reduced. A minute quantity of cool make-up oil will pass the metering valve 400i and mix with the pumping oil in the pumping chamber to further maintain the temperature of the pumping fluid and associated pump parts at a favorable operating temperature level.

On the next thrust stroke of the piston 280 the vapor condenses and a minute quantity of driving oil in the pumping chamber will be purged through relief valve 400r. In condensing, the vapor returns some heat to the oil. However, apparently because vapor is formed quickly and condensation occurs at a lower formation rate, the vapor is compressed and rises to a temperature above that of the oil and pump parts and heat will be transferred from the vapor through pump parts and away from the oil. Thus useful cooling of parts of the pump in contact with the oil is believed to be achieved.

It is to be noted that recirculation of a large quantity of oil is not considered essential to the function of cavitation cooling of the pumping liquid. However, a small amount of oil circulation is provided in the pump described to supply make-up oil to the body of pumping oil when the spray gun is turned on. The amount of make-up oil is metered so that the driving oil will attain a desired volume for pumping liquid at maximum pumping efficiency. The make-up oil is metered to build up the driving liquid volume in the pumping chamber in about twenty to one hundred cycles of the piston, for example, depending on desired operational characteristics. With a high number of strokes required for make-up liquid purposes, there is a higher efficacy of the cavitation cooling function. However, a longer make-up time delay will be required to replenish the driving liquid in the pump 270 for highest pumping capacity.

The pump, 270, in the example set forth above, cycles at about 600 piston recirprocations per minute. To make-up the driving liquid for maximum pumping capacity after a cavitation periodof operation requires about twenty reciprocations. This takes about two seconds. However, the pump will start pumping fluids in a much lesser time interval at less than maximum pumping capacity. The pump also meters in the most oil during cavitation operation because, at this time, a minimum pressure is present in the pumping liquid chamber.

While I have shown and described in detail different modifications of my invention including a presently preferred embodiment thereof, obviously different parts of the different structure disclosed can be interchanged for corresponding parts having identical or similar functions in the several modifications of the invention. Accordingly, it is to be understood that modifications hereof within keeping of the teachings of the present disclosure will occur to others familiar with the art. For this reason, I wish not to be limited in my invention only to the details of construction of the specific embodiments shown and described, but by the spirit and scope of the following claims.

I claim:

1. In liquid driven diaphragm fluid power transfer pump apparatus including a housing separated into a liquid chamber and a fluid chamber by a diaphragm and wherein the diaphragm has limiting positions of movement in the pump housing; a reciprocable piston in said housing for driving a mass of liquid in said liquid chamber to drive said diaphragm; means for controlling the quantity of liquid in said liquid chamber including a source of driving liquid, liquid supply valve means in liquid communication between said source and said mass of liquid, means for biasing said supply valve means to normally closed position, said supply valve means being opened by relatively low liquid pressure; liquid vent valve means in communication with liquid in said liquid chamber and having low pressure liquid outlet means, said vent valve means being biased to normally closed position and being opened by pressure exerted by driving liquid in said housing when said exerted pressure exceeds by a predetermined degree of pressure the pressure of fluid being pumped through said fluid chamber, and control valve means in said housing on the fluid side of said diaphragm for controlling flow of fluid through said fluid chamber, said control valve means including a closeable fluid port, said control valve means, when closed, causing operation of said vent valve means at one limiting position of said diaphragm.

2. The apparatus of claim 1 wherein said liquid vent valve means are calibrated valve means including a housing forming a valve seat of predetermined cross-sectional area, movable valve means for engaging said seat and being acted on by pressure of the mass of fluid in said cross-sectional area, pre-set biasing means for biasing said movable valve means into engagement with said seat and opposing liquid pressure, and means for liquid sealingly mounting said calibrated valve means for actuation by said liquid pressure.

3. In apparatus according to claim 1, a port formed in the housing having an internal extended valve seat of a first predetermined surface area, and a valve having a perimetrical edge around a smaller predetermined area, said edge being cooperable with said seat for closing said port, said diaphragm being secured to said valve on a side thereof opposite said port and extending beyond said edge, said diaphragm being adapted to engage the surface area of said seat beyond said edge with said edge in engagement with said seat.

4. In a pump as set forth in claim 3, said extended valve seat being generally flat, and said valve being generally flat for intimate engagement with said seat.

5. In a pump as set forth in claim 3, said edge being chamfered away from said diaphragm to reduce the stresses in said diaphragm affected by liquid pressure variations thereon.

6. In a pump as set forth in claim 3, a second port formed in the housing on the opposite side of the diaphragm substantially the same as said first port and having a similarly extended second valve, surface area, and a second valve similarly sized and shaped as said first valve and being cooperable with said second seat for closing said second port, said diaphragm being secured between said first and second valves.

7. In a pump as set forth in claim 6, each of said extended valve seats being generally flat, and said valves being generally flat for intimate engagement with said seats.

8. In a pump as set forth in clam 7, said first and second valve edges being chamfered away from said diaphragm to reduce the stresses in said diaphragm affected by liquid pressure variations thereon.

9. In a pump as set forth in claim 8, the distal area of said edges being tapered to a knife-edge.

10. In a pump as set forth in claim 3, a second port formed in the housing substantially the same as said first port and having a valve seat surface area, a second valve cooperable with said second seat for closing said second port, said first and second valves being secured to said diaphragm.

11. In a pump having a housing containing a liquid driven diaphragm movable between limiting positions and forming a movable wall for a variable volume chamber adapted for driving a fluid, a port formed in the housing having an internal extended valve seat of a first predetermined surface area, a first valve having a perimetrical edge around a smaller predetermined area, said edge being cooperable with said seat for closing said port, said diaphragm being secured to said valve on a side thereof opposite said port and extending beyond said edge, said diaphragm being adapted to engage the surface area of said seat beyond said edge with said edge in engagement with said seat; and means for controlling the quantity of liquid in the pump comprising, a source of driving liquid, liquid supply valve means in liquid communication between said source and the driving side of the diaphragm, said supply valve means being biased to closed position and being opened by relatively low liquid pressure, and liquid vent valve means in liquid communication with the driving side of the diaphragm, said vent valve means being biased to closed position and being opened by pressure exerted by the driving liquid exceeding the pressure of the pumped fluid, said first valve when in engagement with said seat causing operation of said vent valve means at one limiting position of the diaphragm.

12. In a liquid driven diaphragm fluid pump of the character described wherein the diaphragm has limiting positions of movement in the pump housing, a reciprocating piston in said housing for driving a mass of liquid for driving said diaphragm, means for controlling the quantity of the liquid in said housing comprising, a source of driving liquid, liquid supply valve means in liquid communication between said source and the mass of liquid, means for biasing said supply valve means to closed position and being opened by relatively low liquid pressure, liquid vent valve means in liquid communication with the mass of liquid and liquid low pressure outlet for said vent valve means, said vent valve means being biased to closed position and being opened by pressure exerted by the driving liquid when said exerted pressure exceeds the pressure of the pumped fluid by a predetermined degree of pressure, and valve means on the pumped fluid side of the diaphragm for controlling the delivery of pumped fluid and including a closable pumped fluid port, said control valve means, when closed, causing operation of said vent valve means at one limiting position of the diaphragm.

13. In a pump as set forth in claim 12, and second control valve means on the driving liquid side of said diaphragm for controlling operation of said supply valve means at another limiting position of the diaphragm.

14. In a pump as set forth in claim 12, said liquid supply valve means being carried by said piston, said liquid source being on a side of said piston opposite said mass of liquid, and a liquid supply passageway through said piston controlled by said valve means.

15. In a pump as set forth in claim 14, said liquid supply valve means including a flexible reed mounted on the side of said piston contacting the mass of liquid.

16. In a pump as set forth in claim 15, said passageway terminating in a valve port normally covered by said reed, said port being relatively small to prevent extrusion of said reed in the area thereof covering said port.

17. In a pump as set forth in claim 16, wherein more than one of said liquid supply valve means are used to increase the liquid flow capacity from said source to the mass of liquid.

18. In a pump as set forth in claim 12, said liquid vent valve means being calibrated valve means comprising, a housing forming a valve seat of predetermined cross-sectional area, a movable valve for engaging said seat and being acted on by pressure of the mass of liquid in said area, a preset spring biasing said movable valve into engagement with said seat and opposing liquid pressure, and means for liquid sealingly mounting said calibrated valve means for actuation by liquid pressure.

19. The liquid driven diaphragm fluid pump of claim 12 wherein the reciprocating piston comprises a power means for driving a variable capacity load of pumped liquid, a driving liquid disposed between said reciprocating piston and said variable capacity load of pumped liquid, and automatically activated means responsive to the demand of said load for controlling the consumption of power of the prime mover.

20. The liquid driven diaphragm fluid pump of claim 19 wherein the automatically actuated means is responsive to the demand of said load for controlling the temperature of the liquid power transfer means.

21. The liquid driven diaphragm fluid pump of claim 12 wherein the control valve comprises a body, screw threads in said body having uniform helical thread lead and diameter, said threads passing entirely through said body whereby the threads can be fabricated by taps from one of the sides of said body, a valve seat cooperable with said threads for securement into one side of said body, and a movable valve member including a support for same and being cooperable with said threads for securement into another side of said body.

22. A valve substantially as set forth in claim 21 including biasing structure urging said valve member into engagement with said valve seat.

23. A valve substantially as set forth in claim 21 including mechanism for adjusting the force exerted by said biasing structure.

24. In a pump having a housing containing a liquid driven diaphragm forming a movable wall for a variable volume chamber adapted for driving a fluid, a port formed in the housing having an internal extended valve seat of a first predetermined surface area, and a valve having a perimetrical edge around a smaller predetermined area, said edge being cooperable with said seat for closing said port, said diaphragm being secured to said valve on a side thereof opposite said port and extending beyond said edge, said diaphragm being adapted to engage the surface area of said seat beyond said edge with said edge in engagement with said seat, a second port formed in the housing on the opposite side of the diaphragm substantially the same as said first port and having a similarly extended second valve surface area, and a second valve similarly sized and shaped as said first valve and being cooperable with said second seat for closing said second port, said diaphragm being secured between said first and second valves, each of said extended valve seats being generally flat, said valves being generally flat for intimate engagement with said seats, said first and second valve edges being chamfered away from said diaphragm to reduce the stresses in said diaphragm affected by liquid pressure variations thereon, the distal area of said edges being tapered to a knife edge.

References Cited

UNITED STATES PATENTS

| | | |
|---|---|---|
| 2,214,922 | 9/1940 | Ericson. |
| 2,711,134 | 6/1955 | Hughes _________ 103—44 X |
| 2,919,650 | 1/1960 | Wiggermann _________ 103—44 |
| 2,953,096 | 9/1960 | Sampietro _________ 103—44 |

FOREIGN PATENTS 480,289   4/1953   Italy.

ROBERT M. WALKER, *Primary Examiner.*